Patented Aug. 27, 1940

2,213,168

UNITED STATES PATENT OFFICE 2,213,168

COMPOSITE PIGMENTS AND PROCESS OF MAKING THE SAME

Reginald Hill Monk and Archibald Stewart Ross, Montreal, Quebec, Canada, assignors to American Zinc, Lead & Smelting Company, St. Louis, Mo., a corporation of Maine No Drawing. Application July 30, 1938, Serial No. 222,299

5 Claims. (Cl. 134—58)

This invention relates to composite pigments of low reactivity and high whitening strength and a process for producing such pigments.

For the purpose of brevity and clearness of description the symbols MO, M'O and $RO_2$ are used herein and are to be understood as meaning—

MO = The oxides of magnesium, zinc, cobalt, nickel, manganese, iron, chromium and/or vanadium, or any combination thereof;

M'O = The oxides of calcium, strontium, barium and/or lead, or any combination thereof;

$RO_2$ = The oxides of titanium, zirconium, thorium and/or tin or any combination thereof.

Compound pigments of the type $2MO.RO_2$ where MO is the oxide of a divalent metal such as magnesium or zinc, and $RO_2$ is the oxide of titanium, are known in the art. (U. S. Patent No. 2,085,165 and German Patent No. 648,518).

Compound pigments of the type $M'O.RO_2$, when M'O is the oxide of a divalent metal, such as calcium or lead, and $RO_2$ is the oxide of titanium, are also known in the art. (U. S. Patent No. 1,760,513 and 1,856,351).

Experience and careful test have demonstrated that compounds of the $2MO.RO_2$ type are of low pigmentary value; and compounds of the $M'O.RO_2$ type are unsatisfactory, for while giving a high degree of opacity they are usually of a poor color in themselves or are easily discolored by traces of impurities, and when zinc oxide or white lead are added thereto in quantities necessary to give a correctly proportioned formula, the composite mixture is highly reactive with vehicles such as linseed oil or gum varnishes or with cellulose varnishes in which gum bases are used.

The fundamental object of the present invention is to provide mixed or composite pigments containing the components existing in the compounds of the $2MO.RO_2$ type but combined in new proportions with the $M'O.RO_2$ type in which compound pigments the reactivity of the reactive compounds is greatly reduced without sacrifice of whitening strength. A further object is to provide an operative method whereby such composite pigments may be produced.

With this end in view, a compound of $2MO.RO_2$ (where MO is the oxide of magnesium, zinc, cobalt, nickel, manganese, iron, chromium and/or vanadium or any combination thereof which combines with an oxide of the $RO_2$ type to form a compound $2MO.RO_2$ as the normal form) is mixed in equimolar proportions with a compound of $2M'O.RO_2$ (where M'O is the oxide of calcium, strontium, barium and/or lead or any combination thereof) combining with oxides of the $RO_2$ type to form a compound $M'O.RO_2$ as its normal form). The components $2M'O$ and $RO_2$ at calcination temperatures form the compound $M'O.RO_2$ together with free oxide M'O, but we have discovered that in the presence of the normal compound of the formula $2MO.RO_2$, the total mixture when calcined possesses to a remarkable degree the low reactivity of a compound of the type $2MO.RO_2$ and the high opacity of the compound $M'O.RO_2$. These characteristics suggest the formation of a pseudomorphic compound of the formula $(2MO.RO_2).(2M'O.RO_2)$, in which the oxide M'O behaves as if it were an oxide of the type MO. Within the limits of the formula of the equimolar compound between the normal $2MO.RO_2$ and the pseudomorphic $2M'O.RO_2$, mixtures of any of the oxides of the MO, M'O or RO types may be substituted for any single oxide. Thus both sides of the formula may be mixtures of a number of oxides falling within the respective groups. For instance, $2MO.RO_2$ may represent in its simplest form $2ZnO.TiO_2$ but it also might imply such a mixture as would be represented by the formula

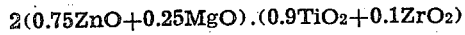
$2(0.75ZnO+0.25MgO).(0.9TiO_2+0.1ZrO_2)$ or more generally, $2(ZnO,MgO).(TiO_2,ZrO_2)$. The essential feature of the invention however is the combination of compounds of this type with equimolar proportions of what is really a hypothetical compound represented by the other half of the formula, namely, $2M'O.RO_2$. In this half of the formula, the simplest form of the compound may be represented by the formula $2CaO.TiO_2$. This, however, may be again expanded into a mixture of oxides such as would be represented by the formula

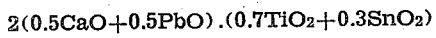
$2(0.5CaO+0.5PbO).(0.7TiO_2+0.3SnO_2)$ or more generally again a

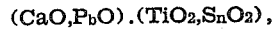
$(CaO,PbO).(TiO_2,SnO_2)$, or combining the two halves of the specific formulae the complete formula for a typical composite, in this case containing seven different metallic oxides, yet so proportioned that it is a combination of stoichiometric equivalence with the desired synthesis of pigmentary properties, may be written

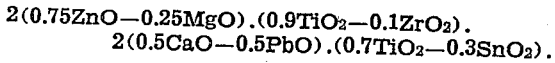

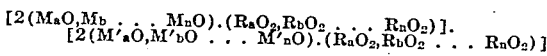

As thus broadly stated, the formula may be written:

$$[2(M_aO, M_b \ldots M_nO).(R_aO_2, R_bO_2 \ldots R_nO_2)]$$
$$[2(M'_aO, M'_bO \ldots M'_nO).(R_aO_2, R_bO_2 \ldots R_nO_2)]$$

in which the formula within the square brackets indicates the equimolar proportions and the formula within the parentheses indicates the mixtures of the respective oxides which may be used and which are to be understood to be taken in summation as equal to one mol of the respective type of oxide. The oxides of magnesium, zinc, cobalt, nickel, manganese, iron, chromium and vanadium are oxides which form compounds of the $2MO.RO_2$ type; and the oxides of calcium, strontium, barium, and lead are oxides which form compounds of the $M'O.RO_2$ type, and can form pseudomorphs of the $2M'O.RO_2$ type. But it is to be understood that any other oxides or salts decomposable into their oxide components which form compounds of the respective types are within the scope of the invention. Moreover, in the case of those composites containing the oxides of the normally polyvalent metals Mn, Fe, Cr, and V, the correct oxidation-reduction potential in the calcining atmosphere may be obtained by calcining in the presence of a reducing gas or by substituting for part of the oxides the respective metals and calcining in an inert atmosphere. And it is further to be understood that by oxides of the $RO_2$ type is meant the oxides of titanium, zirconium, thorium and tin. The oxides may be prepared in the wet way or the dry way, and a mixture of oxides may be employed instead of a single oxide, provided that the total mols of the mixture of oxides equals the number of mols of the single oxide for which they are substituted, and it is to be understood that when mention is herein made of an oxide, that term includes, and is intended to include equivalent mixture of such oxides.

In practicing the invention the material should be prepared in a high state of dispersion to secure the maximum degree of combination. Coprecipitation from solution is an ideal method when feasible from an economical point of view. Or solid reagents may be ground together in the proper molar proportions in cases where a somewhat greater degree of reactivity is permissible. Furthermore a mixture of solid and liquid reagents may be employed in some cases. For example, zinc oxide prepared by the usual process of oxidizing zinc sulfide may be combined with freshly precipitated $TiO_2$ and then calcium carbonate may be intimately dispersed among these two solids by precipitation from a solution of calcium chloride. Moreover, solid reagents may be used when these are decomposable by heat or in reactions with other components of the mixture during calcination.

The following are specific examples of the practice of the process:

*Example 1.*—Two mols of calcium chloride are dissolved in water to give a solution containing ten percent by weight of calcium chloride. This solution is mixed with two mols of precipitated $TiO_2$ which has been dispersed by the addition of approximately ten percent by weight on the dry $TiO_2$ content of barium chloride dihydrate. The mixed suspension thus prepared is then added under vigorous agitation to two mols of commercial zinc oxide previously prepared in aqueous suspension containing approximately twenty-five percent by weight of dry zinc oxide. To the mixture containing the $TiO_2$, $ZrO$ and $CaCl_2$, two mols of sodium carbonate in aqueous solution containing ten percent anhydrous $Na_2CO_3$ are added under vigorous agitation and the resultant intimate mixture of solids consisting of ZnO, $TiO_2$, $CaCO_3$ (together with a small amount of $BaSO_4$) is filtered off, thoroughly washed and calcined to approximately 900° C., whereby the calcium carbonate is decomposed into CaO and $CO_2$ and reaction between the ZnO, $TiO_2$ and CaO takes place to give the compound $(2ZnO.TiO_2).(2CaO.TiO_2)$ substantially as described.

*Example 2.*—The above compound may be prepared from commercial lime by removing its impurities in the following manner:

Sufficient commercial lime to give 2 mols of calcium chloride is treated with a 10% solution of ammonium chloride. The exact amount of lime required is determined by experiment since the percentage of available lime soluble in ammonium chloride varies with the thermal treatment to which the calcium carbonate has been subjected in the burning process, as well as the amount of insoluble impurities, particularly magnesia and silica. The suspension of lime in reaction with ammonum chloride at temperatures from 80° to 100° C. gives a solution of calcium chloride and ammonia. In view of the volatility of the ammonia, the reaction is preferably carried out in a closed vessel fitted with a reflux condenser. The solution is then cooled to approximately 60 or 70° C. and to the reaction vessel is added, under agitation, 2 mols of ZnO mixed to a thick paste with water. Carbon dioxide is then passed into the mix and in the presence of the ammonia the calcium chloride is rapidly converted to calcium carbonate, the reaction being completed in 15 to 30 minutes under a gauge pressure of 15 lbs. $CO_2$. At the conclusion of the reaction the suspension is filtered off and the filter cake is thoroughly mixed with 2 mols of precipitated $TiO_2$. The filtered liquor containing ammonium chloride is made up to its original strength as by suitable additions of dry ammonium chloride and is returned to the reaction vessel.

The mixture of the filter cake with $TiO_2$ is filtered off and calcined at approximately 900° C. to give the same product as in Example 1.

*Example 3.*—A solution of lead acetate of approximately 1.04 specific gravity is allowed to act upon granulated lead in the presence of air at approximately 30 to 35° C. The basic lead acetate solution thus formed is precipitated by $CO_2$ and allowed to settle. After filtering off the basic lead carbonate, $Pb(OH)_2.2PbCO_3$, the lead acetate solution is returned to the reaction chamber to react with more lead.

$\frac{2}{3}$ mol of the precipitated basic lead carbonate is condensed in an edge runner for 20 to 30 minutes with 2 mols of commercial zinc oxide and 2 mols of precipitated $TiO_2$. The mixture is then calcined to about 800 to 900° C. to give the compound $(2ZnO.TiO_2).(2PbO.TiO_2)$.

It will be found that in the use of the composite pigment produced by the process described, the reactivity of the reactive components is greatly reduced while the whitening strength remains unimpaired.

What is claimed is:

1. A composite pigment consisting of $(2MO.TiO_2).(2M'O.TiO_2)$, where MO is at least one of the oxides of the group ZnO, MgO, CoO, NiO, MnO, FeO, CrO, VO and M'O is at least one of the oxides of the group CaO, SrO, BaO, and PbO.

2. A composite pigment consisting of $(2ZnO.TiO_2).(2M'O.TiO_2)$ where M'O is at least one of the oxides of the group CaO, SrO, BaO, PbO.

3. In a process of preparing a composite pigment of the formula $(2ZnO.TiO_2).(2CaO.TiO_2)$ the steps of mixing in the proportions required by the formula an aqueous suspension of zinc oxide and dispersed $TiO_2$ with a solution of calcium chloride, precipitating the calcium chloride with a chemically equivalent quantity of a carbonate of sodium, filtering off the mixed composite precipitate and calcining it at a temperature of approximately 900° C.

4. A composite pigment consisting of $(2ZnO.TiO_2).(2CaO.TiO_2)$.

5. The process which consists in mixing a compound of the $2MO.TiO_2$ type, where MO is one or more of the oxides of the elements zinc, magnesium, cobalt, nickel, manganese, iron, chromium and vanadium which combine with $TiO_2$ to form a compound $2MO.TiO_2$ as the normal form, with equimolar proportions of a compound of the pseudomorphic $2M'O.TiO_2$ type, where M'O is one or more of the oxides of the elements, calcium, strontium, barium and lead which combine with $TiO_2$ to form a compound $M'O.TiO_2$ as its normal form, and then calcining the mixture.

REGINALD HILL MONK.
ARCHIBALD STEWART ROSS.